United States Patent [19]

Murakami

[11] Patent Number: 5,578,372
[45] Date of Patent: Nov. 26, 1996

[54] HEAT-WELDABLE COMPOSITE FILMS AND METHOD OF PRODUCTION THEREOF

[75] Inventor: Tadashi Murakami, Amagasaki, Japan

[73] Assignee: Daicel Chemical Industries, Ltd., Osaka, Japan

[21] Appl. No.: 218,040

[22] Filed: Mar. 22, 1994

Related U.S. Application Data

[63] Continuation of Ser. No. 852,238, filed as PCT/JP91/01380 Oct. 9, 1991 published as WO92/05956 Apr. 16, 1992, abandoned.

[30] Foreign Application Priority Data

Oct. 9, 1990 [JP] Japan .................................. 2-271877
Oct. 9, 1990 [JP] Japan .................................. 2-271878

[51] Int. Cl.⁶ .......................... B32B 7/12; B32B 27/30; C08F 14/08; C08J 5/18

[52] U.S. Cl. .......... 428/336; 156/331.7; 427/402; 428/347; 428/349; 428/412; 428/423.5; 428/423.7; 428/424.2; 428/424.4; 428/424.6; 428/424.7; 428/424.8; 428/473.5; 428/474.4; 428/480; 428/483; 428/510; 428/516; 428/518; 428/533; 428/910

[58] Field of Search .......................... 428/336, 347, 428/349, 412, 423.5, 423.7, 424.2, 424.4, 424.6, 424.7, 424.8, 473.5, 474.4, 480, 500, 533, 910, 483, 510, 516, 518; 156/331.7; 427/402

[56] References Cited

U.S. PATENT DOCUMENTS

| | | |
|---|---|---|
| 3,297,518 | 1/1967 | Maschner et al. ............... 428/424.6 X |
| 3,514,367 | 5/1970 | James .................................. 428/424.6 |
| 3,622,439 | 11/1971 | Manne et al. ........................... 161/184 |
| 3,887,757 | 6/1975 | Stone et al. ......................... 428/424.6 |
| 4,410,595 | 10/1983 | Matsumoto et al. ..................... 428/412 |

FOREIGN PATENT DOCUMENTS

| | | |
|---|---|---|
| 0372886 | 6/1990 | European Pat. Off. . |
| 46-5059 | 2/1971 | Japan . |
| 47-43628 | 11/1972 | Japan . |
| 48-72289 | 9/1973 | Japan . |
| 55-154160 | 12/1980 | Japan . |
| 56-46731 | 4/1981 | Japan . |
| 58-69435 | 5/1983 | Japan . |
| 63-233836 | 9/1988 | Japan . |
| 47-10642 | 5/1992 | Japan . |

*Primary Examiner*—D. S. Nakarani
*Attorney, Agent, or Firm*—Spencer & Frank

[57] ABSTRACT

Composite films have a layer structure comprising a base film, and a coating layer containing a vinylidene chloride polymer, a laminating agent layer composed of a polyisocyanate component and a polyol component, and a polymer film as laminated in that order on at least one side of the base film. The vinylidene chloride polymer is a copolymer having a vinylidene chloride content of 91 to 94% or a copolymer having a weight average molecular weight of $7.5 \times 10^4$ to $20 \times 10^4$. By using such copolymer, the transparency and gas barrier properties can be prevented from decreasing and the heat-sealed portions from whitening. The base film includes nylon films, among others. The base film may also be a stretched or oriented one. The polymer film includes heat-weldable films.

11 Claims, 2 Drawing Sheets

HEAT-WELDABLE COMPOSITE FILMS AND METHOD OF PRODUCTION THEREOF

This application is a continuation of application Ser. No. 07/852,238, filed as PCT/JP91/01380 published as WO92/05956 Apr. 16, 1992, now abandoned.

CROSS-REFERENCE TO RELATED APPLICATION

This application is the national stage of International Application PCT/JP91/01380 filed Oct. 9th, 1991, and claims priority to Japanese Application No. 271877/1990 filed Oct. 9th, 1990 and Japanese Application No. 271878/1990 filed Oct. 9th, 1990, the specifications of which are hereby incorporated by reference.

TECHNICAL FIELD

The present invention relates to composite films, in particular packaging films suited for use as retortable pouches, and to a method of producing the same.

BACKGROUND ART

Retortable pouches are required to have not only those performance characteristics that are required of food packaging materials but also resistance to retort treatment. Generally, this retort treatment is conducted under pressure at a temperature of 110° to 120° C. for about 30 to 60 minutes. Meanwhile, nylon films have an advantage over other plastic films in that they have good wear resistance and good optical properties such as gloss and transparency, among others, and particularly in that they have good oil resistance, heat resistance and cold resistance, hence can be used in a wide temperature range. Therefore they are widely used as packaging materials for foods to be retort-treated. However, nylon films are still insufficient in gas barrier properties such as oxygen gas and steam barrier properties.

For increasing gas barrier properties, it is of use to apply a vinylidene chloride polymer to plastic films. Thus, for instance, Japanese Patent laid open No. 233836/1988 proposes gas barrier films comprising a plastic film and a layer containing a swellable silicate having a layer structure, for example montmorillonite, and a vinylidene chloride polymer as formed on at least one side of the film. Generally, however, films in which a nylon film is used as the plastic film are inferior in heat sealability and, furthermore, their gas barrier properties markedly deteriorate upon retort treatment.

Therefore, for providing composite materials while providing them with gas barrier properties, laminated films have also been proposed which comprise a nylon film, a vinylidene chloride polymer film laminated thereon, a laminating agent containing a polyisocyanate component and a polyol component as applied to the latter film and, further, a film laminated thereon.

The laminated films having the constitution mentioned above show high gas barrier properties before retort treatment but, upon retort treatment, their gas barrier properties decrease markedly. In addition, the laminated films become hazy upon retort treatment, which results in markedly decreased transparency. Furthermore, pouches or the like made from such films by heat sealing or the like, when subjected to retort treatment, undergo marked whitening in the sealed portions. The extent of this whitening increases with the increasing heat sealing temperature. The causes of these are presumably as follows. Thus, the isocyanate component in the laminating agent reacts with moisture in air or, in some instances, with an active hydrogen atom of the vinylidene chloride polymer contained in the coating layer mentioned above. Since this causes partial deactivation of the isocyanate component, the unreacted polyol component remains in excess in the laminating agent layer. Upon retort treatment, the unreacted polyol component that remains migrates into the coating layer mentioned above and inhibits crystallization of the vinylidene chloride polymer, whereby the transparency and gas barrier properties of the laminated films are impaired. Further, it is presumable that when pouches or the like are manufactured by heat sealing, the sealing heat causes melting of the vinylidene chloride polymer to thereby destroy the crystalline structure; the heat-sealed portions thus may readily undergo whitening when exposed to high temperature water for retort treatment.

DISCLOSURE OF THE INVENTION

Accordingly, it is an object of the invention to provide composite films which retain high gas barrier properties and transparency even when subjected to retort treatment, irrespective of laminating agent.

It is another object of the invention to provide composite films which, when made into pouches or the like by a heat sealing and subjected to retort treatment, can prevent the sealed portions from whitening.

A further object of the invention is to provide a method of producing composite films showing good performance characteristics such as mentioned above.

For achieving the above objects, the invention provides composite films which have a layer structure comprising a base film and a coat layer containing a vinylidene chloride polymer, a laminating agent layer composed of a polyisocyanate component and a polyol component and a polymer film as laminated in that order on at least one side of said base film and in which the vinylidene chloride content of said vinylidene chloride polymer is 91 to 94% by weight.

The above objects of this invention can be accomplished also by providing composite films which have the same layer structure as mentioned above and in which the vinylidene chloride polymer has a weight average molecular weight of $7.5 \times 10^4$ to $20 \times 10^4$.

In these composite films, retort treatment presumably fails to inhibit crystallization of the vinylidene chloride polymer. As a result, even when the composite films containing the above-specified vinylidene chloride polymer in the coat layer are subjected to retort treatment or heat sealing, their transparency and gas barrier properties are prevented from decreasing and the heat-sealed portions from whitening.

The base film and polymer film may include various films, for example olefin polymer films such as polypropylene films, polyester films such as polyethylene terephthalate films, and nylon or polyamide films. At least one of the base film and polymer film should preferably have heat bondability or weldability. In preferred composite films, the base film is a nylon film and the polymer film has heat bondability. The base film may be a stretched film.

As examples of the vinylidene chloride polymer, there may be mentioned copolymers of vinylidene chloride and at least one monomer copolymerizable therewith, for example acrylonitrile, vinyl chloride, vinyl acetate, acrylic acid, methacrylic acid, an acrylate or a methacrylate. The vinylidene chloride polymer includes copolymers which show a melting point of not lower than 125° C. on a differential scanning calorimeter (DSC).

The composite films can be obtained by a production method which comprises coating steps for applying a coating composition containing the above-specified vinylidene chloride polymer and a laminating agent containing a polyisocyanate component and a polyol component in that order to at least one side of a base film, and a laminating step for laminating a polymer film onto the above laminating agent layer.

These objects of the invention and the advantages thereof will become more apparent from the following detailed description.

DETAILED DESCRIPTION OF THE INVENTION

Figure 1:
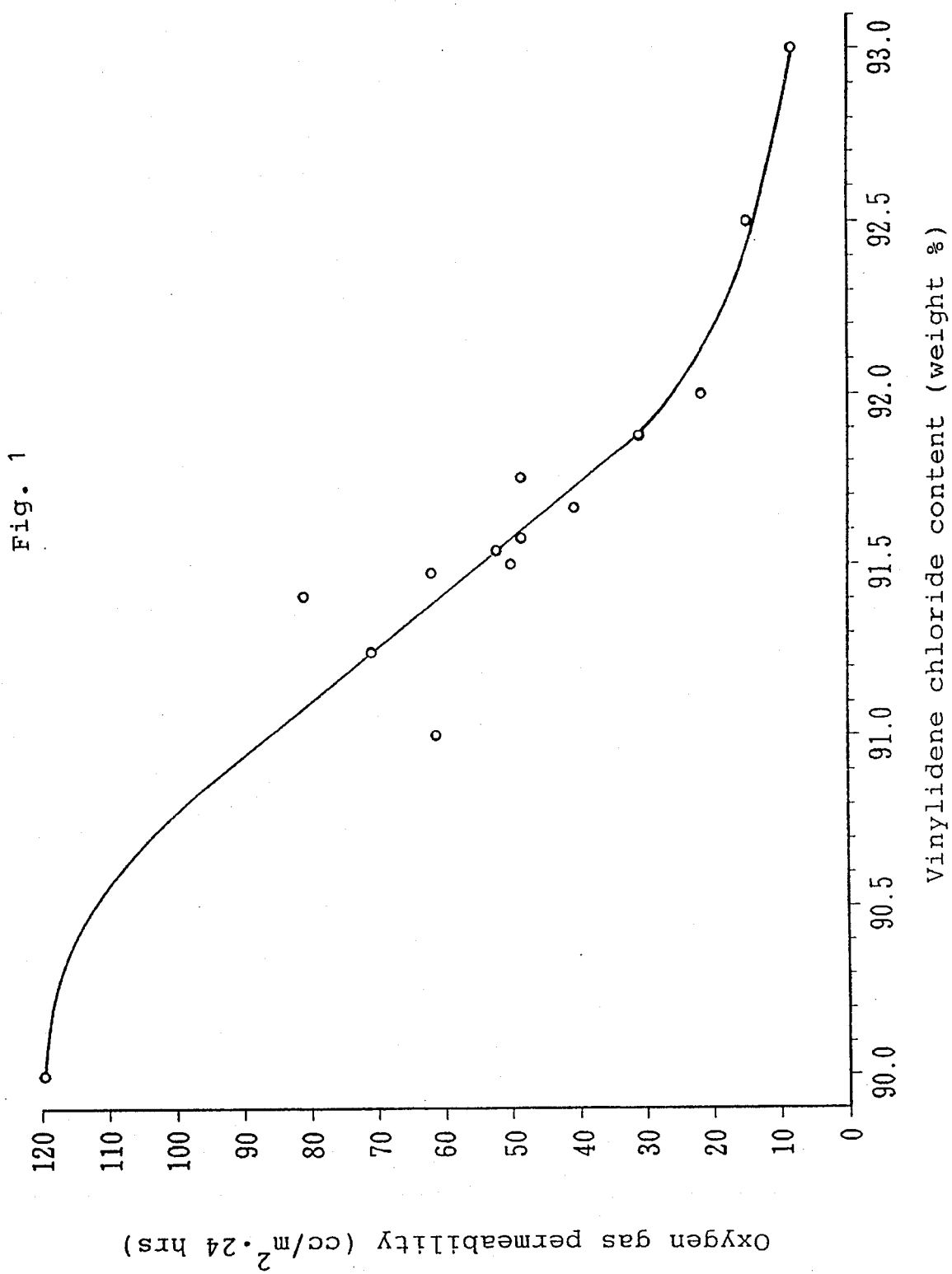
FIG. 1 graphically shows the relationship between the vinylidene chloride content and the oxygen gas permeability as found in the examples and comparative examples.

As examples of the above-mentioned base film, there may be mentioned various films derived from such materials as olefin polymers, e.g. polyethylene, ethylene-ethyl acrylate copolymers, ionomers, polypropylene, ethylene-propylene copolymers, poly-4-methylpentene-1, etc.; ethylene-vinyl alcohol copolymers; polyvinyl chloride; vinylidene chloride polymers, e.g. polyvinylidene chloride, vinylidene chloride-vinyl chloride copolymers, vinylidene chloride-acrylonitrile copolymers, etc.; styrenic polymers, e.g. polystyrene, styrene-acrylonitrile copolymers, styrene-acrylonitrilebutadiene copolymers, etc.; polyesters, e.g. polyethylene terephthalate, polybutylene terephthalate, etc.; nylons or polyamides; polyacrylonitrile; polycarbonates; polyimides; and cellophane.

Among the base films mentioned above, olefin polymer-based films (in particular polypropylene films), polyester-based films (in particular polyethylene terephthalate films) and nylon films are preferred. Nylon films that can be used in a wide temperature range are particularly preferred base films. The nylon film-constituting nylon is, for example, nylon 6, nylon 11, nylon 12, nylon 66, nylon 610, nylon 612 or a copolymer nylon (e.g. nylon 6/66, nylon 66/610, nylon 6/11). At least one of these nylon species is used.

The base film may be an unstretched one or a uniaxially or biaxially stretched or oriented one. The method of stretching may include conventional stretching methods, such as calendering, rolling, belt stretching, tentering and tubular stretching, and combinations of these. The draw ratio may suitably be selected depending on the desired film characteristics and is, for example, 1.5 to 20 times, preferably about 2 to 15 times. The stretching is carried out at a temperature, which is not higher than the melting point of the film-constituting polymer and not lower than the second-order transition point thereof. After stretching, the film may be heat-treated in a taut condition for fixation of the orientation of molecules. Stretching, in particular biaxial stretching or orientation treatment, can markedly increase the strength and other properties of the film.

The base film may be subjected to surface treatment such as corona discharge treatment, high frequency treatment, flame treatment, chromic acid treatment or solvent treatment, as necessary.

The base film may be a single-layer film or a composite film resulting from lamination of two or more films. The thickness of the base film is not critical but may be, for example, 1 to 250 μm, preferably about 5 to 100 μm.

A coating layer containing a vinylidene chloride polymer of the first type which has a vinylidene chloride content of 91 to 94% by weight, preferably 91.5 to 93% by weight, is formed on at least one side of the above base film. If the vinylidene chloride content is less than 91% by weight, the composite films after retort treatment will have decreased gas barrier properties and transparency. If, conversely, said content exceeds 94% by weight, the vinylidene chloride polymer will show decreased solubility in solvents. Owing to its high vinylidene chloride content, the above-mentioned vinylidene chloride polymer shows good heat resistance and a high degree of initial crystallinity and resists disintegration of crystals by hot water in the step of retort treatment. Even if the crystallinity decreases upon retort treatment, it appears that the rate of subsequent restoration is high and allows rapid crystallization. Formation of the above coat layer containing vinylidene chloride polymer leads to a decreased extent of whitening of the heat-sealed portions on retort treatment following heat sealing. The vinylidene chloride polymer of the first type has a molecular weight within a range in which the film-forming property and solubility in solvents are not impaired, for example a weight average molecular weight of $1 \times 10^4$ to $30 \times 10^4$ preferably about $5 \times 10^4$ to $25 \times 10^4$.

In accordance with another aspect of the invention, a coat layer containing a vinylidene chloride polymer of the second type which has a weight average molecular weight of $7.5 \times 10^4$ to $20 \times 10^4$ preferably about $9 \times 10^4$, to $16 \times 10^4$, is formed on at least one side of the above-mentioned base film. When the vinylidene chloride polymer has a weight average molecular weight of less than $7.5 \times 10^4$, the composite film after retort treatment will show decreased gas barrier properties and transparency, and the extent of whitening of the sealed portions will be great. When the weight average molecular weight exceeds $20 \times 10^4$, the solubility of the vinylidene chloride polymer in solvents decreases. Composite films with the above coat layer show high gas barrier properties before retort treatment as well. The vinylidene chloride content in the vinylidene chloride polymer of the second type is within a range in which the gas barrier properties and other properties are not impaired, for example 80 to 94% by weight, preferably about 85 to 94% by weight.

In a more preferred embodiment, the above coat layer contains a vinylidene chloride polymer having a vinylidene chloride content of 91 to 94% by weight (more preferably 91.5 to 93% by weight), and a weight average molecular weight of $7.5 \times 10^4$ to $20 \times 10^4$ (more preferably $9 \times 10^4$ to $16 \times 10^4$).

The vinylidene chloride polymer mentioned above is composed of vinylidene chloride and a copolymerizable monomer or monomers copolymerizable therewith. Said polymerizable monomers include, among others, vinyl chloride, vinyl acetate, crotonic acid, acrylic acid, methyl acrylate, ethyl acrylate, propyl acrylate, isopropyl acrylate, butyl acrylate, isobutyl acrylate, tert-butyl acrylate, pentyl acrylate, hexyl acrylate, heptyl acrylate, octyl acrylate, 2-ethylhexyl acrylate, other various acrylates, acrylonitrile, methacrylonitrile, methacrylic acid, and methacrylates corresponding to the acrylates mentioned above. These copolymerizable monomers are used either singly or in combination of two or more. Preferred among the above copolymers are vinylidene chloride-acrylonitrile copolymers, vinylidene chloride-vinyl chloride copolymers, vinylidene chloride-vinyl acetate copolymers, vinylidene chloride-acrylic acid copolymers, vinylidene chloride-methacrylic acid copolymers, vinylidene chloride-acrylate copolymers and vinylidene chloride-methacrylate copolymers. At least one of these vinylidene chloride polymers is used.

The melting point of the vinylidene chloride polymer may suitably be selected depending on the retort treatment temperature. Generally, however, said melting point is not lower than 125° C., preferably not lower than 130° C., more preferably not lower than 140° C., as measured on a differential scanning calorimeter (DSC). If the vinylidene chloride polymer has a melting point lower than 125° C., the coat layer will readily become hazy at a retort treatment temperature of about 120° C. and the gas barrier properties will deteriorate, for instance. As the melting point of the vinylidene chloride polymer rises, the coat layer becomes more resistant to high retort treatment temperatures and the whitening of the coat layer and the reduction in gas barrier properties can be prevented to a greater extent. As mentioned above, the retort treatment is conducted generally at a temperature of about 110° to 120° C. for about 30 to 60 minutes.

The thickness of the coat layer is not critical provided that the gas barrier properties are not impaired. Generally, however, said thickness is 0.01 to 5 μm, preferably about 0.1 to 3 μm. If the layer thickness is less than 0.01 μm, it will be difficult to provide high gas barrier properties. Thicknesses exceeding 5 μm are not economical but may disadvantageously lead to decreases in performance characteristics of the base film in some instances.

The vinylidene chloride polymer-containing coat layer can be formed by applying a coating composition containing a vinylidene chloride polymer to the base film, followed by drying. The coating composition may be an aqueous coating composition containing an emulsion type vinylidene chloride polymer obtained by emulsion polymerization, for instance, or a solvent-type coating composition containing a solvent-soluble vinylidene chloride polymer and an organic solvent.

The organic solvent in the solvent-type coating composition may be a solvent capable of dissolving or dispersing the above vinylidene chloride polymer therein, for example a ketone such as acetone, methyl ethyl ketone or cyclohexanone, an ether such as dioxane or tetrahydrofuran, an aromatic hydrocarbon such as benzene or toluene, a halogenated hydrocarbon such as methylene chloride or ethylene chloride, or a mixed solvent composed of these.

The means of coating is not critical but may be a conventional one, for example a dip coater, roll coater, gravure coater or air knife coater.

A laminating agent layer is formed on the coat layer. The laminating agent layer comprises a two-component type urethane adhesive containing a polyisocyanate component and a polyol component.

The polyisocyanate component includes conventional compounds, for example aliphatic polyisocyanates such as hexamethylene-1,6-diisocyanate, 1,3,6-hexamethylenetriisocyanate and lysine diisocyanate; aromatic polyisocyanates such as p-phenylene diisocyanate, ω,ω-diisocyanato-1,3-dimethylbenzene, ω,ω-diisocyanato-1,4-dimethylbenzene, 2,4-tolylene diisocyanate, 2,6-tolylene diisocyanate, diphenylmethane-4,4'-diisocyanate, 3,3'-dimethyldiphenylmethane-4,4'-diisocyanate, triphenylmethane-triisocyanate and 1,5-naphthalenediisocyanate; alicyclic polyisocyanates such as isophoronediisocyanate, dicyclohexylmethane-4,4'-diisocyanate, ω,ω-diisocyanato-1,3-dimethylcyclohexane, ω,ω-diisocyanato-1,4-dimethylcyclohexane and cyclohexane-1,4-diisocyanate; and araliphatic polyisocyanates such as xylylene diisocyanate and tetramethylxylylene diisocyanate. The polyisocyanate component may be a polyhydric alcohol-polyisocyanate adduct having terminal isocyanate groups, an isocyanate compound resulting from the biuret reaction, or a dimer or trimer. The polyisocyanate component may be a single compound or a mixture of two or more compounds.

The polyol component includes compounds generally used in two-component type curable urethane adhesives, for example hydroxy-containing polyester polyols obtainable by reaction of a polyhydric alcohol and a polybasic carboxylic acid or a lower alkyl ester or acid anhydride thereof; and hydroxy-containing polyester polyurethane polyols obtainable by reaction of the a polyester polyol as mentioned above and such a polyisocyanate component as mentioned above. These polyol components may be used either singly or in admixture.

As the polyhydric alcohol, there may be mentioned, for example, aliphatic polyhydric alcohols such as ethylene glycol, diethylene glycol, triethylene glycol, polyethylene glycol, propylene glycol, dipropylene glycol, tripropylene glycol, polypropylene glycol, 1,3-butanediol, tetramethylene glycol, hexamethylene glycol, neopentyl glycol, trimethylolpropane and pentaerythritol; alicyclic polyhydric alcohols such as 1,4-cyclohexanedimethanol; and aromatic polyhydric alcohols such as 2,2-bis(2-hydroxyethylphenyl)propane and 2,2-bis(2-hydroxypropylphenyl)propane.

As the polybasic carboxylic acid, there may be mentioned, for example, aliphatic polybasic carboxylic acids such as succinic acid, adipic acid, pimellic acid, suberic acid, azelaic-acid, sebacic acid, dodecanoic acid, maleic acid, fumaric acid and itaconic acid; alicyclic polybasic carboxylic acids such as 1,4-cyclohexanedicarboxylic acid; and aromatic poly-basic carboxylic acids such as phthalic acid, terephthalic acid, isophthalic acid, trimellitic acid and pyromellitic acid.

The polyol component may be a modified polyol obtained by reacting a polyol component and an ethylenically unsaturated carboxylic acid or an acid anhydride thereof in the presence of a radical generator, as disclosed in Japanese Patent laid open No. 209282/1986.

Generally, the polyol component mentioned above has a weight average molecular weight of about 500 to 100,000.

A polyhydric alcohol, polyether polyol, polyether polyurethane polyol or the like may be added to the above polyol component each in an amount that will not impair the retort treatment.

In accordance with the invention, the coat layer contains a vinylidene chloride polymer with a high vinylidene chloride content or a vinylidene chloride polymer having a specific molecular weight and therefore the high gas barrier properties and transparency can be retained and the degree of whitening of the sealed portions can remain slight even after retort treatment irrespective of the proportions of the polyisocyanate component and polyol component. Therefore, the proportions of the polyisocyanate component and polyol component mentioned above are not critical provided that the strength of lamination with the polymer film is not impaired. The proportions of the polyisocyanate component and polyol component are generally such that the isocyanato group/hydroxyl group mole ratio is about 0.8 to 1.2. Meanwhile, as mentioned above, when the laminating agent layer is cured, the polyol component tends to partly remain as a result of partial deactivation of the polyisocyanate component. For further preventing possible decreases or reductions in transparency and gas barrier properties upon retort treatment as arising from the remaining polyol component, the polyisocyanate component should preferably be used in excess relative to the polyol component. The proportions of the polyisocyanate component and polyol component are such that the isocyanate group/hydroxyl group mole ratio is equal to 1.2 to 4, preferably about 1.5 to 2.5.

The thickness of the laminating agent layer may be selected within a range in which the strength of bonding to the polymer film is not impaired, generally within the range of 0.1 to 10 μm, preferably about 0.5 to 5 μm.

The above laminating agent layer can be formed by applying a laminating agent containing the above-mentioned polyisocyanate component and polyol component to the above-mentioned coat layer. The laminating agent is generally used in the form of a solution in an organic solvent. As the organic solvent, there may be mentioned, for example aliphatic hydrocarbons such as hexane; alicyclic hydrocarbons such as cyclohexane; aromatic hydrocarbons such as benzene, toluene and xylene; ketones such as acetone and methyl ethyl ketone; esters such as ethyl acetate; and mixed solvents composed of two or more of these.

The laminating agent layer can be cured after lamination of the polymer film to the laminating agent layer, at a temperature of about 30° to 50° C., for instance.

In accordance with a further aspect of the invention, a protective layer is interposed between the coat layer and laminating agent layer mentioned above. Said protective layer inhibits the permeation of the components of the laminating layer into the coat layer. The protective layer may be a layer capable of inhibiting the permeation of the components of the laminating agent layer into the coat layer either chemically by means of chemical affinity or chemical bonding power or physically. The protective layer performs the above function and may be made of a transparent material having heat resistance and water resistance. Thus the protective layer may be made of a thermoplastic resin such as a vinyl chloride-vinyl acetate copolymer, an acrylic polymer, polyvinyl alcohol or an ethylene-vinyl alcohol copolymer; a thermosetting resin such as an epoxy resin; or a photocurable resin such as an ultraviolet-curable or electron beam-curable resin, for instance. Thermoplastic resins, in particular ethylene-vinyl alcohol copolymers, are preferred materials for forming the protective layer.

The protective layer containing an ethylene-vinyl alcohol copolymer may be formed by the extrusion lamination method, for instance, but is preferably formed by using a coating composition containing a solvent-soluble ethylene-vinyl alcohol copolymer so that the layer thickness can be reduced. The solvent-soluble ethylene-vinyl alcohol copolymer has an ethylene content of 5 to 50 mole percent, preferably 10 to 45 mole percent, more preferably 25 to 35 mole percent. The ethylene-vinyl alcohol copolymer has a molecular weight of $1\times10^4$ to $10\times10^4$, preferably about $4\times10^4$ to $5\times10^4$.

The ethylene-vinyl alcohol copolymer generally has a melt flow index (MFI) of about 5 to 10 g/10 minutes as determined at a temperature of 21° C. and under a load of 2,160 g, an apparent melt viscosity of 5,000 to 15,000 poises, preferably about 7,500 to 12,500 poises, as determined at a temperature of 210° C. and a load of 50 kg using a 1 mm Φ×10 mm nozzle, and a degree of saponification of not less than 99.5%.

Generally, such copolymer can be solubilized in a mixed solvent of water and an alcohol and can form a thin protective layer.

The thickness of the protective layer is, for example, 0.01 to 5 μm, preferably about 0.1 to 3 μm.

The polymer film to be laminated onto the above laminating agent layer may be made of the same material as the base film mentioned above and is selected depending on the intended use of the product composite film. The lamination of the polymer film can be performed in the conventional manner by contact bonding of the polymer film to the laminating agent layer under pressure.

The composite films according to the invention are required only to have a layer structure comprising at least the above-mentioned base film, coat layer, laminating agent layer and polymer film. Thus, at least one more polymer film may be laminated to the above-mentioned polymer film by dry lamination, extrusion lamination or the like method.

In such composite films, at least one of the base film and polymer film preferably have heat weldability so that they can be made into pouches or the like by heat sealing, impulse sealing, ultrasonic welding or the like method. The polymer film having heat weldability is not limited to any particular species but may be made of olefin polymers such as polyethylene e.g. low-density polyethylene, polyethylene containing an ethylene-vinyl acetate copolymer, an ethylene-vinyl acetate copolymer, an ethylene-ethyl acrylate copolymer, an ethylene-α-olefin copolymer, an ionomer, unstretched polypropylene, an ethylene-propylene copolymer or the like; polyvinyl alcohol, or an ethylene-vinyl alcohol copolymer, for instance. Preferred heat-weldable polymer films are olefin polymer films such as polyethylene films and unstretched polypropylene films.

In cases where neither the base film nor the polymer film is heat-weldable, a heat-weldable polymer film may be laminated to at least one of the base film and polymer film. The base film and/or polymer film may be provided with heat weldability by means of a coating layer comprising a heat-weldable polymer, for example a vinyl chloride-vinyl acetate copolymer, polyvinyl alcohol, a solvent-soluble ethylene-vinyl alcohol copolymer or a styrene-butadiene copolymer. The thickness of the polymer film mentioned above may be selected within the same range as specified for the base film, and the thickness of the coating layer is generally about 0.1 to 5 μm.

Preferred composite films comprises the above-mentioned base film, coat layer, laminating agent layer and heat-weldable polymer film.

The coat layer, laminating agent layer and polymer film may be formed on each side of the base film. In that case, at least one of the polymer films on both sides preferably have heat weldability.

Those composite films in which the base film is a nylon 6 film and the polymer film is an unstretched polypropylene film, when subjected to 30 minutes of retort treatment at 120° C. and heat sealing at 150° C., show, for example, the following characteristics.

(1) Films in which the vinylidene chloride polymer used is of the first type:

Oxygen gas permeability: 5 to 80 cc/m²•24 hours;

Haze: 70% or less;

Heat-sealed portion: transparent (2) Films in which the vinylidene chloride polymer used is of the second type:

Oxygen gas permeability: 5 to 45 cc/m²•24 hours;

Haze: 5 to 55%;

Heat-sealed portion: transparent

The coat layer, protective layer and laminating agent layer may, if necessary, contain such a polymer as an olefin polymer, e.g. an ethylene-vinyl acetate copolymer or ethylene-ethyl acrylate copolymer, an acrylic polymer, a styrene polymer, a polyester, a polyacetal, polyvinyl acetate, an ethylene-vinyl acetate copolymer, polyvinyl chloride, a vinyl chloride-vinyl acetate copolymer, a polyamide, a polyurethane, a polycarbonate, a chlorinated polyolefin, or a cellulosic polymer. The above-mentioned base film, coat layer, protective layer, laminating agent layer and polymer film may, as necessary, contain one or more additives. As the additives, there may be mentioned antioxidants, ultraviolet absorbers, heat stabilizers, plasticizers, antistatic agents, tackifiers, plasticizers, fillers, lubricants such as waxes and finely powdered lubricants, dyes and pigments, among others. The level of addition of the above-mentioned polymer and additives is generally not more than 5% by weight.

INDUSTRIAL APPLICABILITY

The composite films of this invention may be used as various packaging films, in particular as packaging films for foods to be retort-treated.

The following examples and comparative examples illustrate the invention in further detail but are by no means limitative of the scope thereof.

EXAMPLES

Examples 1 to 13 and Comparative Example 1

A coating composition containing a vinylidene chloride polymer content of 12% by Weight was prepared by uniformly admixing 100 parts by weight of a vinylidene chloride-acrylate copolymer with a vinylidene chloride content specified below in Table 1—1, 1 part by weight of a wax having a melting point of 78° C. and 0.1 part by weight of finely divided silica (as lubricant) having an average particle size of 3 μm with a tetrahydrofuran/toluene=70/30 (by weight) mixture.

The vinylidene chloride content was determined by measuring the chlorine concentration of the vinylidene chloride polymer. The vinylidene chloride polymers used in Examples 1 to 13 had a weight average molecular weight of $7.5 \times 10^4$ to $8 \times 10^4$ while the vinylidene chloride polymer used in Comparative Example 1 had a weight average molecular weight of $7 \times 10^4$. The weight average molecular weight of each vinylidene chloride polymer was determined by gel permeation chromatography.

The coating composition obtained was applied to one side of a biaxially stretched nylon 6 film having a thickness of 15 μm in an amount of 1.3 g/m² (on the dried basis) using a bar coater.

A laminating agent was then prepared by admixing a polyol component (AD-806, product of Toyo Morton Co., Ltd.) with a polyisocyanate component (RT-8, product of Toyo Morton Co., Ltd.) in an isocyanate group/hydroxyl group mole ratio of 1.2. The laminating agent obtained was applied to the coated side of the nylon film in an amount of 3.0 g/m² (on the dried basis), and an unstretched polypropylene film (P-1143, product of Toyobo Co., Ltd.) was laminated onto the laminating agent layer under pressure to give a composite film.

The composite film thus obtained was subjected to 30 minutes of retort treatment at a temperature of 120° C. and, immediately thereafter, the oxygen gas permeability and haze (%) were determined. The oxygen gas permeability was measured by gas chromatography as follows. Thus, 80%-humid oxygen gas and helium gas (compensation gas) were used and the measurement was carried out on a Lyssy model L-66 gas permeability testing apparatus at a temperature of 20° C. The oxygen gas permeability was expressed in terms of cc/m²/24 hours.

Before retort treatment, the composite films showed a haze of about 7% and an oxygen gas permeability of 6 to 7 cc/m²/24 hours.

Figure 2:
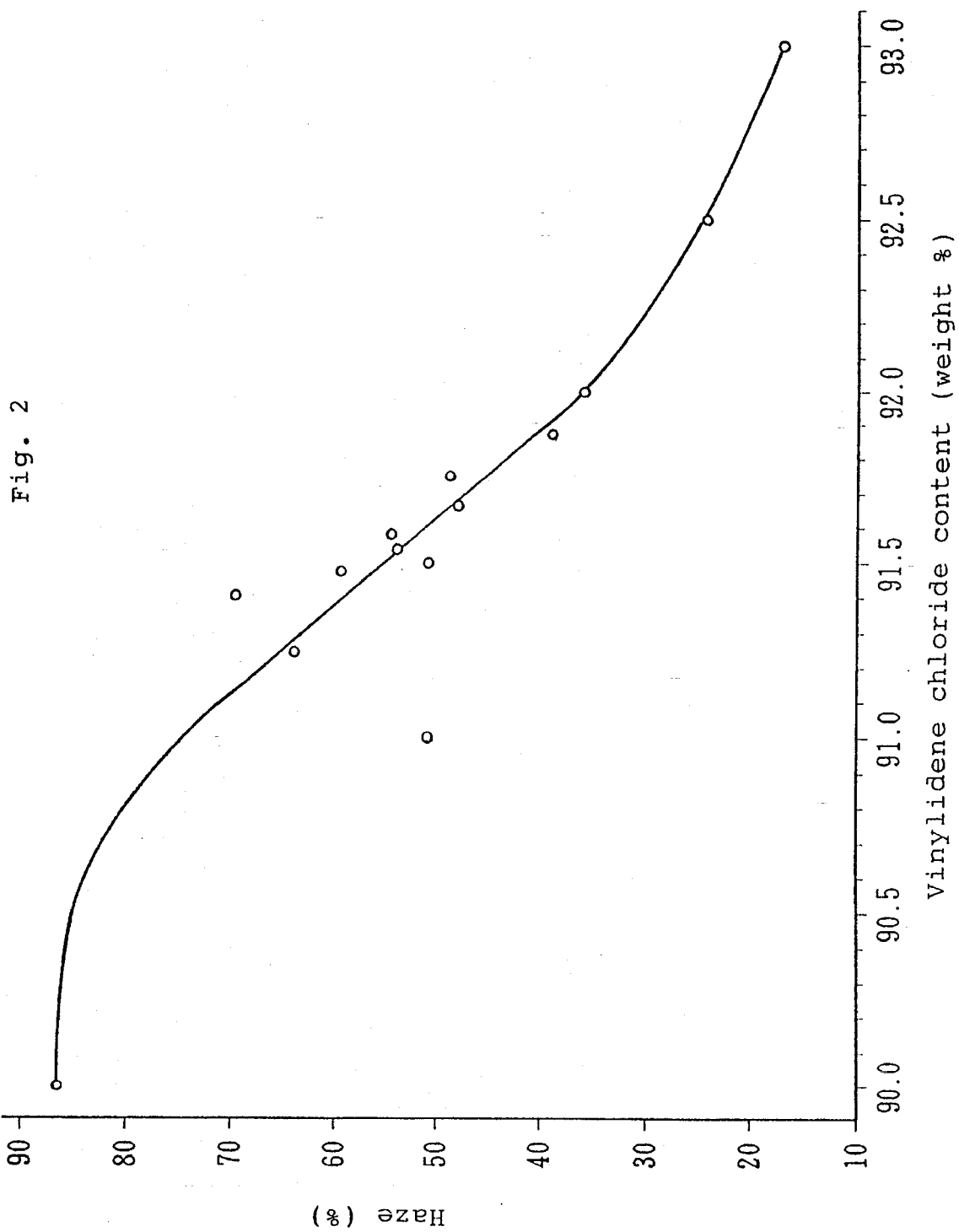
FIG. 2 graphically shows the relationship between the vinylidene chloride content and the haze as found in the examples and comparative examples.

The results thus obtained are shown in Table 1—1, the vinylidene chloride content-oxygen gas permeability relationship as found is shown in FIG. 1 and the vinylidene chloride content-haze relationship as found is shown in FIG. 2.

TABLE 1-1

|  | Vinylidene chloride content (weight %) | Oxygen gas permeability (cc/m²/24 hours) | Haze (%) |
| --- | --- | --- | --- |
| Comparative Example 1 | 90.00 | 120 | 87.2 |
| Example 1 | 91.00 | 61.5 | 50.9 |
| Example 2 | 91.25 | 70.9 | 64.0 |
| Example 3 | 91.41 | 81.1 | 70.2 |
| Example 4 | 91.47 | 62.0 | 59.3 |
| Example 5 | 91.50 | 50.2 | 50.9 |
| Example 6 | 91.54 | 52.2 | 53.9 |
| Example 7 | 91.58 | 48.1 | 54.4 |
| Example 8 | 91.66 | 40.6 | 48.3 |
| Example 9 | 91.75 | 48.3 | 49.0 |
| Example 10 | 91.87 | 31.0 | 39.1 |
| Example 11 | 92.00 | 21.0 | 36.2 |
| Example 12 | 92.50 | 14.4 | 24.8 |
| Example 13 | 93.00 | 8.0 | 17.0 |

Furthermore, each composite film was made into pouches by unstretched polypropylene film-to-unstretched polypropylene film heat sealing at a temperature of 150° C. or 160° C. and a pressure of 2 kg/cm². The contacting time was 1 second. The pouches were subjected to the same retort treatment as mentioned above and the degree of whitening of the heat-sealed portion after retort treatment was evaluated according to the following criteria.

Evaluation criteria

Excellent (Exc.): transparent;

Good: almost transparent;

Failure; whitening

The relationship as found between the vinylidene chloride content and the degree of whitening of the heat-sealed portion is shown in Table 1–2.

TABLE 1-2

| | Comparative Example 1 | Example | | | | | |
|---|---|---|---|---|---|---|---|
| | | 1 | 2 | 3 | 4 | 5 | 6 |
| Vinylidene chloride content | 90.00 | 91.00 | 91.25 | 91.41 | 91.47 | 91.50 | 91.54 |
| Heat sealing temperature (°C.) | | | | | | | |
| 150° C. | Failure | Exc. | Exc. | Exc. | Exc. | Exc. | Exc. |
| 160° C. | Failure | Good | Good | Good | Good. | Exc. | Exc. |

| | Example | | | | | | |
|---|---|---|---|---|---|---|---|
| | 7 | 8 | 9 | 10 | 11 | 12 | 13 |
| Vinylidene chloride content | 91.58 | 91.66 | 91.75 | 91.87 | 92.00 | 92.50 | 93.00 |
| Heat sealing temperature (°C.) | | | | | | | |
| 150° C. | Exc. | Exc. | Exc. | Exc. | Exc. | Exc. | Exc. |
| 160° C. | Exc. | Exc. | Exc. | Exc. | Exc. | Exc. | Exc. |

As can be seen from Table 1—1, Table 1-2, FIG. 1 and FIG. 2, the composite film of Comparative Example 1 shows an increased turbidity and oxygen gas permeability after retort treatment. On the contrary, with the composite films of Examples 1 to 13, the cloudiness and oxygen gas permeability are at low levels even after retort treatment, showing a tendency toward decrease with the increasing vinylidene chloride content.

Examples 14 to 16

Composite films were manufactured in the same manner as in Example 1 except that the vinylidene chloride-acrylate copolymers (vinylidene chloride content 91.6% by weight) differing in weight average molecular weight as shown in Table 2 were used. The composite films obtained were subjected to retort treatment under the same conditions as used in Example 1 and, immediately thereafter, evaluated for oxygen gas permeability and haze. The results obtained are shown in Table 2.

TABLE 2

| | Weight average molecular weight ($\times 10^4$) | Oxygen gas permeability (cc/m²/24 hours) | Haze (%) |
|---|---|---|---|
| Example 14 | 9 | 19.5 | 38.3 |
| Example 15 | 11 | 18.8 | 33.1 |
| Example 16 | 14 | 14.0 | 29.8 |

Example 17 to 19 and Comparative Example 2

A coating composition was prepared by uniformly admixing 100 parts by weight of a vinylidene chloride-acrylate copolymer having a weight average molecular weight specified in Table 3, 1 part by weight of a wax having a melting point of 78° C. and 0.1 part by weight of finely divided silica (as lubricant) having an average particle size of 3 μm with a tetrahydrofuran-toluene=70/30 (by weight) mixture. The vinylidene chloride-acrylate copolymers used in Examples 17 to 19 had a vinylidene chloride content of 91.6% by weight and the vinylidene chloride-acrylate copolymer used in Comparative Example 2 had a vinylidene chloride content of 90.5% by weight.

The coating composition obtained was applied to one side of a biaxially stretched nylon 6 film having a thickness of 15 μm in an amount of 2.0 g/m² (on the dried basis) using a bar coater.

Then, the laminating agent prepared in Example 1 was applied to the coated side of the nylon film in an amount of 3.0 g/m² (on the dried basis) and an unstretched polypropylene film (P-1143, product of Toyobo Co., Ltd.) was laminated onto the coated face under pressure to give a composite film.

Examples 20 to 22 and Comparative Example 3

Composite films were produced in the same manner as in Example 17 except that a laminating agent prepared by admixing a polyol component (AD-563A, product of Toyo Morton Co., Ltd.) with a polyisocyanate component (AD-563B, product of Toyo Morton Co., Ltd.) in an isocyanate group/hydroxyl group mole ratio of 1.2 was used.

The thus-obtained composite films were subjected to 30 minutes of retort treatment at 120° C. Haze (%) and oxygen gas permeability measurements were made before retort treatment and immediately after retort treatment.

Pouches were produced from the composite films by unstretched polypropylenefilm-to-unstretched polypropylene film heat sealing at a temperature within the range of 130° to 190° C. and a pressure of 2 kg/cm². The contacting time for heat sealing was 1 second. The pouches were subjected to the same retort treatment as mentioned above and, immediately thereafter, their heat-sealed portions were evaluated for whitening according to the following criteria.

Evaluation criteria

Excellent (Exc.): transparent;

Good: somewhat cloudy;

Failure: cloudy

The relative crystallinity of each of the vinylidene chloride polymers used in the above examples and comparative examples was calculated based on the transmittance data obtained by infrared absorption spectrophotometry at the wavelengths 1040 cm⁻¹ and 1070 cm⁻¹ according to the formula $$\log(1040 \text{ cm}^{-1})/\log(1070 \text{ cm}^{-1}).$$

The results obtained are shown in Table 3, together with the weight average molecular weight and relative crystallinity of each vinylidene chloride polymer.

TABLE 3

| | Vinylidene chloride polymer | | | | Oxygen gas | |
|---|---|---|---|---|---|---|
| | Weight average | Relative | Haze (%) | | permeability | |
| | molecular weight (× 10$^4$) | crystallinity | Initial | After retorting | Initial | After retorting |
| Comparative Example 2 | 7 | 1.1 | 7.0 | 72.4 | 5.6 | 20.4 |
| Example 17 | 9 | 1.3 | 7.0 | 14.2 | 4.4 | 14.0 |
| Example 18 | 11 | 1.3 | 7.0 | 11.9 | 4.2 | 13.2 |
| Example 19 | 14 | 1.3 | 7.0 | 10.6 | 4.1 | 12.3 |
| Comparative Example 3 | 7 | 1.1 | 7.0 | 18.0 | 5.8 | 8.8 |
| Example 20 | 9 | 1.3 | 7.0 | 12.9 | 4.2 | 6.8 |
| Example 21 | 11 | 1.3 | 7.0 | 12.2 | 4.2 | 6.6 |
| Example 22 | 14 | 1.3 | 7.0 | 10.0 | 3.7 | 6.2 |

| | Whitening of the sealed portion | | | | |
|---|---|---|---|---|---|
| | 150° C. | 160° C. | 170° C. | 180° C. | 190° C. |
| Comparative Example 2 | Good | Good | Failure | Failure | Failure |
| Example 17 | Exc. | Exc. | Exc. | Good | Failure |
| Example 18 | Exc. | Exc. | Exc. | Good | Failure |
| Example 19 | Exc. | Exc. | Exc. | Exc. | Good |
| Comparative Example 3 | Good | Good | Failure | Failure | Failure |
| Example 20 | Exc. | Exc. | Exc. | Cood | Failure |
| Example 21 | Exc. | Exc. | Exc. | Good | Failure |
| Example 22 | Exc. | Exc. | Exc. | Exc. | Good |

From Table 3, it is seen that the composite films of Comparative Examples 2 and 3 show an increased turbidity and oxygen gas permeability after retort treatment and also an increased extent of whitening. On the contrary, the composite films of the examples show low levels of turbidity and oxygen gas permeability even after retort treatment and a smaller extent of whitening in the heat-sealed portion.

Example 23

A composite film was produced in the same manner as in Example 1 except that a further vinylidene chloride-acrylate copolymer (vinylidene chloride content 91.3% by weight, weight average molecular weight 9× 10$^4$, melting point 143° C.) was used.

Example 24

A composite film was produced in the same manner as in Example 1 except that a vinylidene chloride-acrylonitrile copolymer (vinylidene chloride content 91% by weight, weight average molecular weight 10×10$^4$, melting point 138° C.) was used.

Example 25

A composite film was produced in the same manner as in Example 1 except that a vinylidene chloride-vinyl chloride copolymer (vinylidene chloride content 92% by weight, weight average molecular weight 15×10$^4$, melting point 148° C.) was used.

Example 26

A composite film was produced in the same manner as in Example 1 except that a laminating agent prepared by mixing the same polyol component and polyisocyanate component as used in Example 1 in an isocyanate group/hydroxyl group mole ratio of 1.5 was used.

Example 27

A composite film was produced in the same manner as in Example 1 except that a laminating agent prepared by mixing the same polyol component and polyisocyanate component as used in Example 1 in an isocyanate group/hydroxyl group mole ratio of 2.5 was used.

Example 28

A coating composition was prepared by uniformly admixing 100 parts by weight of the same vinylidene chloride-acrylate copolymer as used in Example 23, 1 part by weight of a wax having a melting point of 78° C. and 0.1 part by weight of finely divided silica (as lubricant) having an average particle size of 3 μm with a tetrahydrofuran/toluene=70/30 (by weight) mixture. This coating composition was applied to one side of a biaxially stretched nylon 6 film having a thickness of 15 μm in an amount of 1.3 g/m$^2$ (on the dried basis) using a bar coater for forming a coat layer.

A coating composition was prepared by adding an ethylene-vinyl alcohol copolymer (Trade name of Soarnol, product of Nippon Synthetic Chemical Industry; ethylene content 29 mole percent) to a mixed solvent of water and isopropanol (mixing ratio 1:1 by weight) and heating the mixture to cause dissolution of the copolymer. The coating composition had an ethylene-vinyl alcohol copolymer content of 10% by weight. This coating composition was applied onto the above coat layer in an amount of 1.0 g/m² (on the dried basis) to thereby form a protective layer.

Then, the laminating agent prepared in Example 1 was applied onto the above protective layer in an amount of 3.5 g/m² (on the dried basis), and an unstretched polypropylene film (P-1143, product of Toyobo Co., Ltd.) was laminated to the coated face under pressure to give a composite film.

The composite films obtained in Examples 23 to 28 were subjected to retort treatment under the same conditions as used in Example 1 and the retort treatment-due turbidity and oxygen gas permeability of each composite film and the extent of whitening of the heat-sealed portion thereof were examined. The results are shown in Table 4.

TABLE 4

| | Haze (%) | | Oxygen gas permeability | | Whitening of the sealed portion | |
|---|---|---|---|---|---|---|
| | Initial | After retorting | Initial | After retorting | 150° C. | 160° C. |
| Example 23 | 7 | 46 | 7 | 31 | Exc. | Exc. |
| Example 24 | 7 | 51 | 7 | 42 | Exc. | Good |
| Example 25 | 7 | 21 | 6 | 9 | Exc. | Exc. |
| Example 26 | 7 | 30 | 7 | 20 | Exc. | Exc. |
| Example 27 | 7 | 20 | 7 | 24 | Exc. | Exc. |
| Example 28 | 12 | 16 | 4 | 9 | Exc. | Exc. |

What is claimed is:

1. A composite film having a layer structure comprising, in order, a uniaxially or biaxially oriented base film, covered on at least one side with a coating layer formed by a coating composition containing a vinylidene chloride copolymer having a vinylidene chloride content of about 91% to 94% by weight, a weight average molecular weight of about $7.5 \times 10^4$ to $20 \times 10^4$ and a melting point of not lower than 125° C. as determined on a differential scanning calorimeter, and an organic solvent; a protective layer made of a member selected from the group consisting of a polyvinyl alcohol and an ethylene-vinyl alcohol copolymer; a laminating layer on said protective layer composed of a two component urethane adhesive containing an organic solvent soluble polyisocyanate component and a polyol component, and the mole ratio of isocyanate groups of said polyisocyanate component to hydroxyl groups of said polyol component being about 1.2 to 4.0; and an olefin polymer film having heat weldability as laminated on said laminating layer, wherein said protective layer lies between said coating layer and said laminating agent layer for inhibiting the permeation of the components of the laminating agent layer into the coating layer.

2. A composite film as claimed in claim 1, wherein the base film and polymer film each independently is made of a member selected from the group consisting of olefin polymers, ethylene-vinyl alcohol copolymers, polyvinyl chloride, styrenic polymers, polyesters, nylons or polyamides, polyacrylonitrile, polycarbonates, polyimides, and cellophane.

3. A composite film as claimed in claim 1, wherein the base film is selected from among olefin polymer films, polyester films, or polyamide films.

4. A composite film as claimed in claim 1, wherein the base film is a polyamide film.

5. A composite film as claimed in claim 1, wherein the vinylidene chloride copolymer has a vinylidene chloride content of 91.5 to 93% by weight.

6. A composite film as claimed in claim 1, wherein the vinylidene chloride copolymer has a weight average molecular weight of about $9 \times 10^4$ to $16 \times 10^4$.

7. A composite film as claimed in claim 1, wherein the vinylidene chloride copolymer comprises at least one copolymer selected from among vinylidene chloride-acrylonitrile copolymers, vinylidene chloride-vinyl chloride copolymers, vinylidene chloride-vinyl acetate copolymers, vinylidene chloride-acrylic acid copolymers, vinylidene chloride-methacrylic acid copolymers, vinylidene chloride-acrylate copolymers or vinylidene chloride-methacrylate copolymers.

8. A composite film as claimed in claim 1, wherein the coating layer has a thickness of 0.01 to 5 μm.

9. A composite film as claimed in claim 1, wherein the proportions of the polyisocyanate component and polyol component are such that the isocyanate group/hydroxyl group mole ratio is equal to 1.5 to 2.5.

10. A composite film as claimed in claim 1, wherein the protective layer is made of a solvent-soluble ethylene-vinyl alcohol copolymer.

11. A method of producing composite films comprising the steps of:

(a) coating at least one side of a base film with a coating composition comprising a vinylidene chloride copolymer having a vinylidene chloride content of about 91% to 94% by weight, a weight average molecular weight of about $7.5 \times 10^4$ to $20 \times 10^4$ and a melting point of not lower than 125° C. as determined on a differential scanning calorimeter and an organic solvent to form a first coating layer;

(b) coating said first coating layer with a composition comprising a member selected from the group consisting of a polyvinyl alcohol and an ethylene-vinyl alcohol copolymer to form a second coating layer which is a protective layer;

(c) coating said second coating layer with a two component laminating agent containing an organic solvent-soluble polyisocyanate component and a polyol component, having a mole ratio of isocyanate groups of said polyisocyanate component to hydroxyl groups of said polyol component of about 1.2 to 4.0 to form a laminating agent layer; and (d) laminating an olefin polymer film having heat weldability onto said laminating agent layer to form a composite film, wherein said second coating layer is a protective layer for inhibiting the permeation of the components of the laminating agent layer into the first coating layer.

* * * * *